(12) United States Patent
Shibata et al.

(10) Patent No.: US 7,974,282 B2
(45) Date of Patent: Jul. 5, 2011

(54) NETWORK APPARATUS FOR REDUNDANT MULTICAST

(75) Inventors: Takeshi Shibata, Yokohama (JP);
Kenichi Sakamoto, Kokubunji (JP);
Hidehiro Fukushima, Fujisawa (JP)

(73) Assignee: Alaxala Networks Corporation, Kanagawa (JP)

( * ) Notice: Subject to any disclaimer, the term of this patent is extended or adjusted under 35 U.S.C. 154(b) by 947 days.

(21) Appl. No.: 11/819,309

(22) Filed: Jun. 26, 2007

(65) Prior Publication Data
US 2008/0130644 A1 Jun. 5, 2008

(30) Foreign Application Priority Data

Dec. 5, 2006 (JP) ................................. 2006-327967

(51) Int. Cl.
*H04L 12/56* (2006.01)
(52) U.S. Cl. .................. 370/390; 370/392; 370/395.71; 370/428
(58) Field of Classification Search .................. 370/399, 370/401, 220, 390, 338, 312, 395.71, 428, 370/392; 398/82; 709/230
See application file for complete search history.

(56) References Cited

U.S. PATENT DOCUMENTS

| | | | | |
|---|---|---|---|---|
| 5,903,564 A * | 5/1999 | Ganmukhi et al. | ........... | 370/399 |
| 6,466,343 B1 * | 10/2002 | Lahat et al. | ........... | 398/82 |
| 6,490,246 B2 * | 12/2002 | Fukushima et al. | ........... | 370/220 |
| 6,735,201 B1 * | 5/2004 | Mahajan et al. | ........... | 370/390 |
| 6,785,274 B2 * | 8/2004 | Mahajan et al. | ........... | 370/390 |
| 6,804,236 B1 * | 10/2004 | Mahajan et al. | ........... | 370/390 |
| 7,308,503 B2 * | 12/2007 | Giraud et al. | ........... | 709/230 |
| 7,406,037 B2 * | 7/2008 | Okita | ........... | 370/218 |
| 2002/0105955 A1 * | 8/2002 | Roberts et al. | ........... | 370/401 |
| 2002/0186694 A1 * | 12/2002 | Mahajan et al. | ........... | 370/390 |
| 2003/0093557 A1 * | 5/2003 | Giraud et al. | ........... | 709/239 |

(Continued)

FOREIGN PATENT DOCUMENTS

JP 2001-186182 12/1999

(Continued)

OTHER PUBLICATIONS

An introduction to the InfiniBand architecture; G F Pfister—High Performance Mass Storage and Parallel I/O, 2001.*

(Continued)

*Primary Examiner* — Salman Ahmed
(74) *Attorney, Agent, or Firm* — Stites & Harbison PLLC; Juan Carlos A. Marquez, Esq.

(57) ABSTRACT

For continuing multicast data transfer according to path control information after being switched from an active status to a standby status, it is necessary that the standby status hold the same path control information as the active status. However, a synchronization of the path control information thereof is not guaranteed. To solve the above-mentioned problem, this invention provides a data transfer apparatus coupled to a network, including a plurality of interfaces for transmitting and receiving data, in which the data transfer apparatus is configured to: create transfer destination information for correlating a destination of the data with the interfaces for transmitting the data to be transmitted to the destination; and transmit, upon reception of multicast data via one of the interfaces before being judged that the transfer destination information has been created, the multicast data from at least one of the interfaces irrespective of the transfer destination information.

11 Claims, 7 Drawing Sheets

U.S. PATENT DOCUMENTS

| | | | |
|---|---|---|---|
| 2005/0195816 A1* | 9/2005 | Sumiyoshi | 370/390 |
| 2005/0226144 A1* | 10/2005 | Okita | 370/219 |
| 2006/0133266 A1* | 6/2006 | Kim et al. | 370/228 |
| 2006/0159092 A1* | 7/2006 | Boers et al. | 370/390 |
| 2007/0027976 A1* | 2/2007 | Sasame et al. | 709/223 |
| 2007/0250182 A1* | 10/2007 | Demachi et al. | 700/9 |
| 2008/0126553 A1* | 5/2008 | Boucher et al. | 709/230 |
| 2008/0130644 A1* | 6/2008 | Shibata et al. | 370/390 |
| 2008/0170550 A1* | 7/2008 | Liu et al. | 370/338 |
| 2009/0019493 A1* | 1/2009 | Li et al. | 725/49 |
| 2009/0147718 A1* | 6/2009 | Liu et al. | 370/312 |
| 2010/0080144 A1* | 4/2010 | Greenberg et al. | 370/253 |
| 2010/0098078 A1* | 4/2010 | Bisdikian | 370/390 |

FOREIGN PATENT DOCUMENTS

| | | |
|---|---|---|
| JP | 2003-143193 | 10/2001 |
| JP | 2002-247089 | 8/2002 |

OTHER PUBLICATIONS

Design and implementation of redundant multiprocessor interconnects in a high capacity router; BJ Kim, HS Kim—Communications, 2005.*

Redundant multiprocessor interconnects for the high capacitor router built on ATCA; BJ Kim, WY Choi, HS Kim—Technology, 2006.*

"Chapter 5 GSRP" AX7800S/AX5400S Software Reference Manual vol. 2, ASLAXZALA Networks Corporation (in Japanesepp. 119-143 with English Translation of pp. 133 to p. 137).

Li, T., et al., Network Working Group, "Cisco Hot Standby Router Protocol (HSRP)", RFC 2281, Mar. 1998, pp. 1-17.

Coltun, R., et al., Network Working Group, "OSPF for IPv6, RFC 2740", Dec. 1999, pp. 1-80.

Pillay-Esnault, P., et al., "OSPFv3 Graceful Restart", May 2006, pp. 1-12.

Hinden, R., Network Working Group, "Virtual Router Redundancy Protocol (VRRP)", RFC 3768, Apr. 2004, pp. 1-27.

* cited by examiner

| DATA TRANSFER APPARATUS | INTERFACE VALID FOR MULTICAST DATA TRANSFER |
|---|---|
| DATA TRANSFER APPARATUS 321 | INTERFACES TO LINES 331, 332, 333 |
| DATA TRANSFER APPARATUS 322 | INTERFACES TO LINES 332, 335, 336 |
| DATA TRANSFER APPARATUS 323 | NONE |
| DATA TRANSFER APPARATUS 421 | INTERFACES TO LINES 431, 433, 434 |
| DATA TRANSFER APPARATUS 422 | INTERFACES TO LINES 431, 433, 434 |

FIG. 5

| DESTINATION ADDRESS | SOURCE ADDRESS | OUTPUT INTERFACE | INPUT INTERFACE |
|---|---|---|---|
| TERMINAL 311 | | INTERFACE TO LINE 331 | |
| GROUP A | TERMINAL 311 | INTERFACE TO LINE 333 | INTERFACE TO LINE 331 |
| | | | |

FIG. 6

| | 731 | 732 | 733 | 734 | 711 |
|---|---|---|---|---|---|
| | DESTINATION ADDRESS | SOURCE ADDRESS | OUTPUT INTERFACE | INPUT NTERFACE | 721 |
| | TERMINAL 311 | | INTERFACE TO LINE 332 | | |
| | | | | | |
| | | | | | |

FIG. 7

| | 831 | 832 | 833 | 834 | 811 |
|---|---|---|---|---|---|
| | DESTINATION ADDRESS | SOURCE ADDRESS | OUTPUT INTERFACE | INPUT INTERFACE | 821 |
| | TERMINAL 311 | | INTERFACE TO LINE 331 | | |
| | | | | | |
| | | | | | |

FIG. 8

| | 931 | 932 | 933 | 934 | 911 |
|---|---|---|---|---|---|
| | DESTINATION ADDRESS | SOURCE ADDRESS | OUTPUT INTERFACE | INPUT INTERFACE | |
| 921 | TERMINAL 311 | | INTERFACE TO LINE 431 | | |
| 922 | GROUP A | TERMINAL 311 | INTERFACE TO LINE 434 | INTERFACE TO LINE 431 | |
| | | | | | |

FIG. 9

| 1031 | 1032 | 1033 | 1034 | 1011 |
|---|---|---|---|---|
| DESTINATION ADDRESS | SOURCE ADDRESS | OUTPUT INTERFACE | INPUT INTERFACE | |
| | | | | |
| | | | | |
| | | | | |

FIG. 10

NETWORK APPARATUS FOR REDUNDANT MULTICAST

CLAIM OF PRIORITY

The present application claims priority from Japanese application JP2006-327967 filed on Dec. 5, 2006, the content of which is hereby incorporated by reference into this application.

BACKGROUND

This invention relates to a data transfer apparatus, and more particularly, to a data transfer apparatus which uses a telecommunication control technique in the Internet.

As a result of increasing expansion of infrastructure for telecommunication networks, transfers of video data, sound data, and the like are now often performed through the telecommunication networks in addition to conventional data transfers for web browsing, email exchange, and the like. Of those, the transfer of video data is also performed through multicast scheme. As compared with the transfer for web browsing and email exchange, in the transfer of video data and sound data, a user is greatly affected by a disturbance in data transfer (e.g., delay in data transfer). Thus, a network having high fault tolerance is required. As a method of enhancing fault tolerance of a network, there are provided a method of enhancing fault tolerance in a data transfer apparatus constituting a network, a method of enhancing fault tolerance of the data transfer apparatus as a constituent element of the network, and a method of enhancing fault tolerance of the network.

One method of enhancing fault tolerance in the data transfer apparatus involves, for example, separating a transfer system and a control system and making those systems redundant (see, for example, "AX7800S/AX5400S Software Reference Manual Vol. 2", ALAXALA Networks Corporation By separating the transfer system and the control system to make operations thereof independent of each other, data transfer can be continued even when a failure occurs in the control system.

An example of the method of enhancing fault tolerance of data transfer apparatuses as a constituent element of the network is a method of constructing a single virtual data transfer apparatus which is made redundant by a plurality of data transfer apparatuses. As means for constructing the virtual data transfer apparatus as described above, there are a VRRP (see, for example, "Virtual Router Redundancy Protocol (VRRP)", RFC3768, April 2004), a GSRP (see, for example, "AX7800S/AX5400S Software Manual Reference Manual Vol. 2", ALAXALA Networks Corporation and an HSRP (see, for example, "Cisco Hot Standby Router Protocol (HSRP)", RFC2281, March 1998).

In the virtual data transfer apparatus composed of the plurality of data transfer apparatuses, each of the data transfer apparatuses is classified into an active status for actually transferring data or a standby status that does not transfer data. A standby system (i.e., the data transfer apparatus of the standby status) transfers data in place of an active system (i.e., the data transfer apparatus of the active status) when a failure occurs in the active system. In general, each of the data transfer apparatuses exchanges path control information which indicates how received data is to be transferred, with the data transfer apparatus adjacent thereto, and constantly updates the information. When the standby system is switched to a new active system at the time of failure of the (ex-) active system, in order for the new active system to perform data transfer in the similar manner as the ex-active system, the standby system needs to hold path control information similar to that of the ex-active system. As a method for the standby system to hold the path control information similar to that of the active system, there is a method in which a standby system also receives information that is received by an active system for creating path control information (see, for example, JP 2003-143193 A), and a method of transferring path control information from an active system to a standby system (see, for example, JP 2001-186182 A).

As a method of enhancing fault tolerance as the network, there is a method of providing a plurality of paths from one data transfer apparatus to another data transfer apparatus in a network, for example. At a time of failure of the one data transfer apparatus, a path that runs through the data transfer apparatus is switched to a path that detours around the data transfer apparatus, whereby data transfer is continued. A failure detection of the data transfer apparatus and an update of the path control information are carried out by path control protocols such as BGP, OSPF, and IS-IS (see, for example, "OSPF for IPv6", RFC2740, December 1999). In addition, each path control protocol provides a method of quickening restoration after detecting a failure in the data transfer apparatus, called a graceful restart.

SUMMARY

For enhancing fault tolerance of data transfer apparatuses as a constituent element of a network, a method in which a standby system holds path control information similar to that of an active system will be discussed.

First, in a case where a standby system also receives information that is received by an active system for creating path control information, there is no guarantee that pieces of path control information created by the standby system and the active system are synchronous with each other unless synchronization is confirmed by transferring the path control information between the active system and the standby system.

Next, in a case of transferring the path control information from the active system to the standby system, when a failure occurs between time points when the path control information is updated by the active system and when the path control information is transferred to the standby system, the path control information of the active system and that of the standby system are not synchronized.

As described above, in either method, the path control information of the active system and that of the standby system may not be synchronized at the time of failure of the active system. When the pieces of path control information are not synchronized, data to be originally transferred may not be transferred. Thus, a primary object of this invention is to provide a data transfer apparatus which can solve the above-mentioned problems.

Further, the standby system becomes necessary only when a failure occurs in the active system and is unnecessary as long as there is no problem in the active system. Thus, constantly carrying out processing for allowing the standby system to hold the path control information similar to that of the active system is disadvantageous in terms of a resource utilization efficiency. Thus, a second object of this invention is to provide a data transfer apparatus which can increase the resource utilization efficiency of the standby system.

According to a representative invention disclosed in this application, there is provided a data transfer apparatus coupled to a network, comprising a plurality of interfaces for transmitting and receiving data, wherein the data transfer apparatus is configured to: create transfer destination information for correlating a destination of the data with the interfaces for transmitting the data to be transmitted to the destination; hold the created transfer destination information; transmit, upon reception of multicast data via one of the interfaces before being judged that the transfer destination information has been created, the multicast data from at least one of the interfaces irrespective of the transfer destination information; and transmit, upon reception of the multicast data via the one of the interfaces after being judged that the transfer destination information has been created, the received data from the interfaces correlated with the destination of the received data by the transfer destination information.

According to an embodiment of this invention, the standby system continues data transfer at the time of the failure of the active system, irrespective of the path control information. Therefore, there is no possibility that multicast data, which is to be originally transferred, is not transferred due to a fact that the path control information of the new active system having shifted from the standby system and that of the ex-active system are not in synchronization with each other.

Further, according to the embodiment of this invention, the standby system does not carry out processing for holding the path control information. Thus, the resource utilization efficiency can be improved.

BRIEF DESCRIPTION OF THE DRAWINGS

FIG. 5 is an explanatory diagram for showing interfaces valid for multicast data transfer in the data transfer apparatuses according to the embodiment of this invention.

FIG. 6 is an explanatory diagram for showing an example of path control information held by a first data transfer apparatus according to the embodiment of this invention.

FIG. 7 is an explanatory diagram for showing an example of the path control information held by a second data transfer apparatus according to the embodiment of this invention.

FIG. 8 is an explanatory diagram for showing an example of the path control information held by a third data transfer apparatus according to the embodiment of this invention.

FIG. 9 is an explanatory diagram for showing an example of the path control information held by an active data transfer apparatus constituting the virtual data transfer apparatus according to the embodiment of this invention.

FIG. 10 is an explanatory diagram for showing an example of the path control information held by a standby data transfer apparatus constituting the virtual data transfer apparatus according to the embodiment of this invention.

DETAILED DESCRIPTION OF THE PREFERRED EMBODIMENTS

Figure 1:
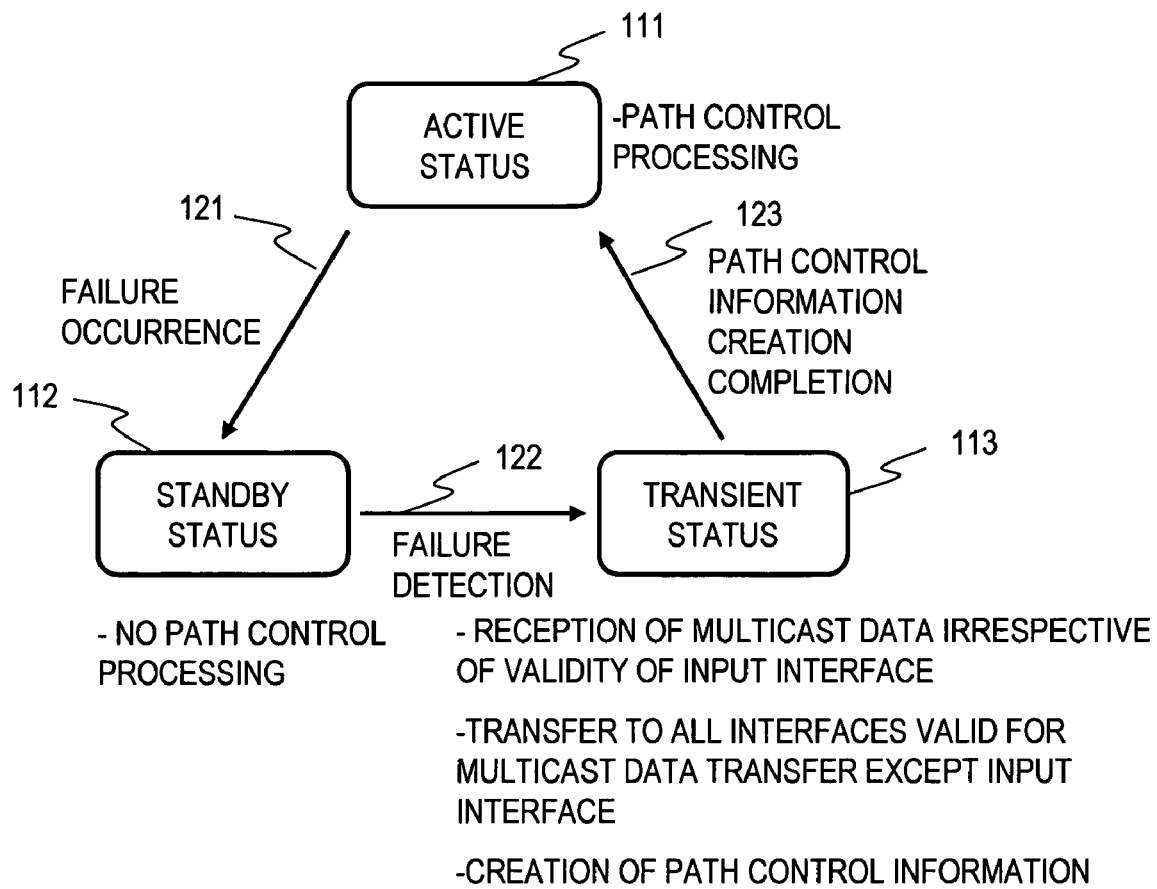
FIG. 1 is an explanatory diagram showing a status transition of a data transfer apparatus according to an embodiment of this invention.

FIG. 1 is an explanatory diagram showing a status transition of a data transfer apparatus according to an embodiment of this invention.

The data transfer apparatus according to this embodiment may transit to any status among three statuses including a transient status 113 in addition to an active status 111 and a standby status 112. The data transfer apparatus of the active status 111 performs path control processing such as data transfer and path information creation, whereas the data transfer apparatus of the standby status 112 does not perform the path control processing such as data transfer and path information creation.

The data transfer apparatus of the transient status 113 executes path control processing different from that of the data transfer apparatus of the active status 111, thereby controlling transfer of data. In other words, the data transfer apparatus of the transient status 113 receives multicast data through an arbitrary interface, transfers the multicast data to all interfaces having multicast data transfer valid, and creates the path control information. It should be noted that, as will be described later by way of specific examples, the data transfer apparatus of the transient status 113 creates the path control information by a protocol similar to conventional protocols.

A status of the data transfer apparatus transits according to events. Specifically, for example, when a failure occurs in the data transfer apparatus in the active status 111, the status of the data transfer apparatus transits from the active status 111 to the standby status 112 through a status transition 121. The standby status 112 transits to the transient status 113 through a status transition 122 when a failure is detected in the data transfer apparatus in the active status 111. The transient status 113 transits to the active status 111 through a status transition 123 when it is judged that creation of the path control information has been completed.

Figure 2:
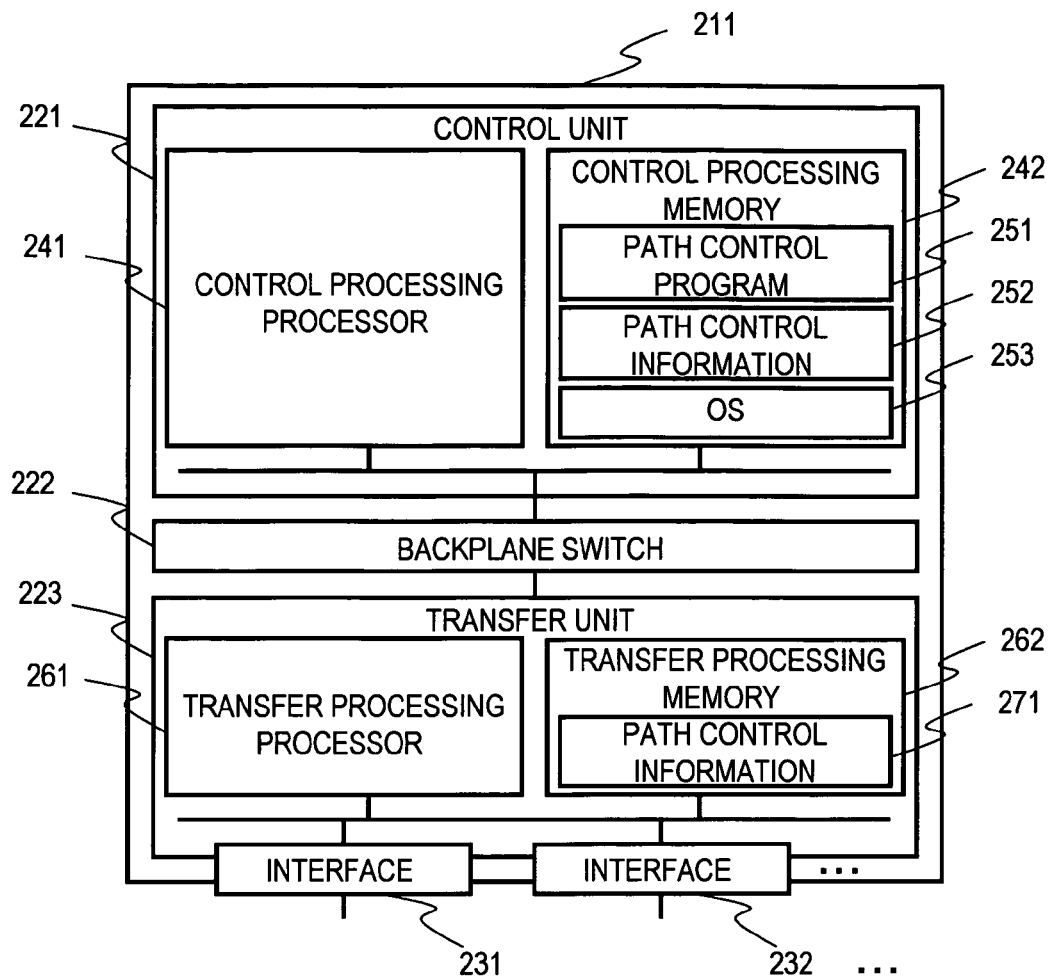
FIG. 2 is a block diagram for showing a configuration of the data transfer apparatus according to the embodiment of this invention.

FIG. 2 is a block diagram for showing a configuration of the data transfer apparatus according to the embodiment of this invention.

A data transfer apparatus 211 includes a control unit 221, a backplane switch 222, a transfer unit 223, and a plurality of interfaces 231, 232, and the like.

The control unit 221 includes a control processing processor 241 and a control processing memory 242. A path control program 251, path control information 252, and an OS 253 are stored in the control processing memory 242. In the control unit 221, the OS 253 is executed in the control processing processor 241, and path control processing is executed based on the path control program 251 and the path control information 252.

The path control information 252 contains information that is referred to for judging whether an input interface is valid when data is input to the data transfer apparatus 211, and information that is referred to for determining an interface for outputting the data input to the data transfer apparatus 211.

The transfer unit 223 includes a transfer processing processor 261 and a transfer processing memory 262. Path control information 271 is stored in the transfer processing memory 262. The path control information 271 contains the same contents as the path control information 252. It should be noted that in the example of FIG. 2, both the control processing memory 242 and the transfer processing memory 262 store the pieces of path control information 252 and 271, respectively. However, one of the pieces of path control information 252 and 271 may be omitted.

The interfaces 231, 232, and the like are connected to lines in a network, which are to be described later. The data transfer apparatus 211 executes data transfer between a terminal or another data transfer apparatus 211 via the interfaces 231, 232, and the like and the lines. The data transfer apparatus 211 can include an arbitrary number of interfaces 231, 232, and the like.

Figure 3:
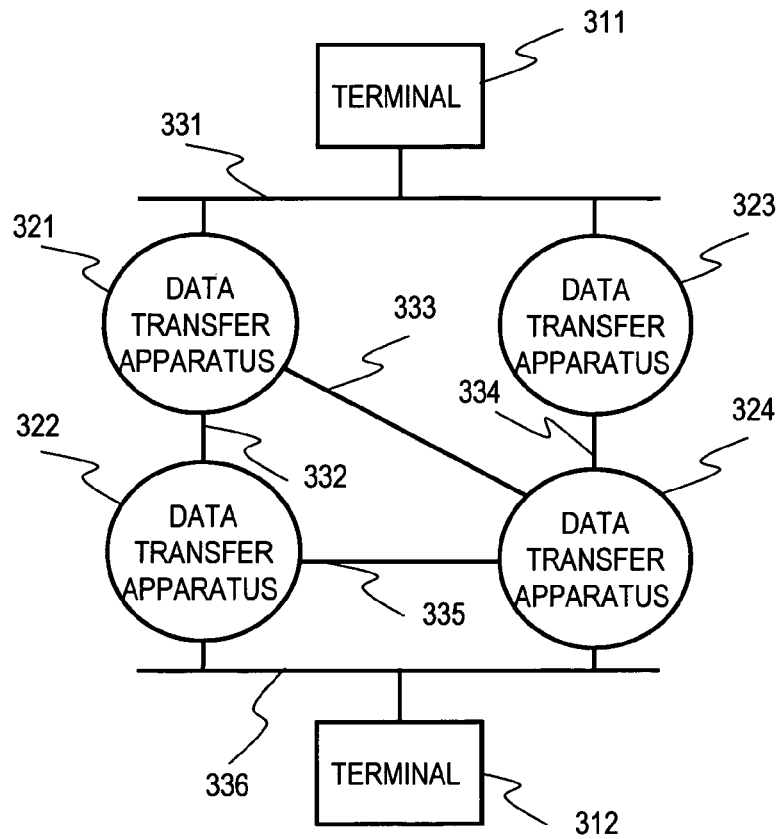
FIG. 3 is an explanatory diagram of a network structure according to the embodiment of this invention.

FIG. 3 is an explanatory diagram of a network structure according to the embodiment of this invention.

In FIG. 3, a terminal 311 is a multicast transmission terminal for transmitting multicast data. A terminal 312 is a multicast reception terminal for receiving the multicast data. Data transfer apparatuses 321 and 322 are multicast data transfer apparatuses for transferring the multicast data. A data transfer apparatus 323 is a non-multicast data transfer apparatus which does not transfer the multicast data. A data transfer apparatus 324 is a virtual multicast data transfer apparatus composed of a plurality of data transfer apparatuses, for transferring the multicast data.

Each of the data transfer apparatuses 321 to 323 corresponds to the data transfer apparatus 211 shown in FIG. 2. A configuration of the data transfer apparatus 324 will be described later with reference to FIG. 4.

Each of the apparatuses shown in FIG. 3 is connected to each other via lines 331 to 336. Specifically, the data transfer apparatus 321 is connected to the terminal 311, the data transfer apparatus 322, and the data transfer apparatus 324 via the lines 331, 332, and 333, respectively. The data transfer apparatus 322 is connected to the data transfer apparatus 321, the data transfer apparatus 324, and the terminal 312 via the lines 332, 335, and 336, respectively. The data transfer apparatus 323 is connected to the terminal 311 and the data transfer apparatus 324 via the lines 331 and 334, respectively. The data transfer apparatus 324 is connected to the data transfer apparatus 321, the data transfer apparatus 323, the data transfer apparatus 322, and the terminal 312 via the lines 333, 334, 335, and 336, respectively.

The data transfer apparatuses 321 to 324 of this embodiment may be of any kind. For example, each of the data transfer apparatuses 321 to 324 may be a switch that operates in a layer 2 (data link layer), or a router or a switch that operates in a layer 3 (network layer).

Figure 4:
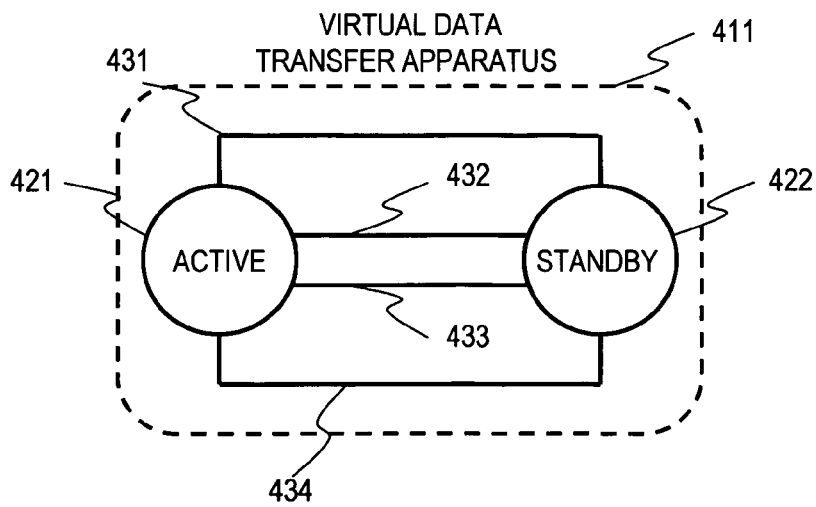
FIG. 4 is an explanatory diagram of a configuration of a virtual multicast data transfer apparatus according to the embodiment of this invention.

FIG. 4 is an explanatory diagram of a configuration of the virtual multicast data transfer apparatus 324 according to the embodiment of this invention.

The virtual multicast data transfer apparatus 324 of this embodiment is a virtual data transfer apparatus 411 composed of two data transfer apparatuses of an active data transfer apparatus 421 and a standby data transfer apparatus 422 shown in FIG. 4. Each of the active data transfer apparatus 421 and the standby data transfer apparatus 422 corresponds to the data transfer apparatus 211 shown in FIG. 2.

The interfaces 231, 232, and the like provided in the two data transfer apparatuses 421 and 422 are connected to the same lines, respectively. Specifically, the interfaces 231, 232, and the like of the active data transfer apparatus 421 are respectively connected to lines 431, 432, 433, and 434. Similarly, the interfaces 231, 232, and the like of the standby data transfer apparatus 422 are respectively connected to the lines 431, 432, 433, and 434. The lines 333, 334, 335, and 336 of FIG. 3 correspond to the lines 431, 432, 433, and 434 of FIG. 4, respectively.

It should be noted that FIG. 4 shows a case where the data transfer apparatus 421 is in the active status and the data transfer apparatus 422 is in the standby status. However, statuses of the data transfer apparatuses 421 and 422 may change as shown in the status transition diagram of FIG. 1.

FIG. 5 is an explanatory diagram for showing interfaces valid for multicast data transfer in the data transfer apparatuses 321, 322, 323, 421, and 422 according to the embodiment of this invention.

Among the interfaces 231, 232, and the like of the data transfer apparatus 321, interfaces connected to the lines 331, 332, and 333 are valid for multicast data transfer. Among the interfaces 231, 232, and the like of the data transfer apparatus 322, interfaces connected to the lines 332, 335, and 336 are valid for multicast data transfer.

In the description below, one of the interfaces 231, 232, and the like that is connected to the line 331 will be referred to as "interface to the line 331", for example. The interfaces 231, 232, and the like connected to other lines will be referred to in a similar manner.

Because the data transfer apparatus 323 is a non-multicast data transfer apparatus, the data transfer apparatus 323 includes no interface valid for multicast data transfer.

Among the interfaces 231, 232, and the like of the data transfer apparatuses 421 and 422 constituting the virtual data transfer apparatus 324, interfaces connected to the lines 431, 433, and 434 (i.e., lines 333, 335, and 336) are valid for multicast data transfer. On the other hand, an interface to the line 432 corresponding to the line 334 connected to the data transfer apparatus 323 is invalid for multicast data transfer.

It should be noted that each data transfer apparatus may hold only information regarding the data transfer apparatus concerned in the control processing memory 242 or the transfer processing memory 262, among pieces of information shown in FIG. 5. For example, the control processing memory 242 or the transfer processing memory 262 of the data transfer apparatus 321 may hold only information indicated by an entry 521 of FIG. 5.

It is assumed that in the network structure shown in FIG. 3, the virtual data transfer apparatus 324 has a higher priority in being selected as a path for multicast data transfer than the data transfer apparatus 322 in the line 336. Further, it is assumed that a path from the virtual data transfer apparatus 324 to the terminal 311 runs through the data transfer apparatus 321. Under the conditions described above, in a case where the terminal 312 receives multicast data addressed to a group A from the terminal 311, pieces of path control information of the data transfer apparatuses 321, 322, and 323 are as shown in FIGS. 6, 7, and 8, respectively. Path control information of the active data transfer apparatus 421 constituting the virtual data transfer apparatus 324 is as shown in FIG. 9. Path control information of the standby data transfer apparatus 422 is as shown in FIG. 10.

FIG. 6 is an explanatory diagram for showing an example of the path control information held by the data transfer apparatus 321 according to the embodiment of this invention.

Path control information 611 shown in FIG. 6 is an example of information held by the data transfer apparatus 321 as the path control information 252 or 271.

The path control information 611 includes four columns of a destination address 631, a source address 632, an output interface 633, and an input interface 634.

An address indicating a destination of data transferred by the data transfer apparatus 321 is registered as the destination address 631.

An address indicating a transmission source of the data transferred by the data transfer apparatus 321 is registered as the source address 632.

Information for identifying the interfaces 231, 232, and the like for outputting the data transferred by the data transfer apparatus 321 is registered as the output interface 633.

Information for identifying the interfaces 231, 232, and the like to which the data transferred by the data transfer apparatus 321 is input is registered as the input interface 634.

In the example of FIG. 6, the "interface to the line 331" is registered as the output interface 633 corresponding to a value "terminal 311" of the destination address 631 (entry 621). No information is registered as the source address 632 and the input interface 634 corresponding to the "terminal 311". The entry 621 indicates that the input interface is valid in a case where data from the terminal 311 is input to the interface to the line 331.

Further, in the example of FIG. 6, the "terminal 311", the "interface to the line 333", and the "interface to the line 331" are respectively registered as the source address 632, the output interface 633, and the input interface 634 corresponding to a value "group A" of the destination address 631 (entry 622). The entry 622 indicates that the data transfer apparatus 321 outputs (transmits) input data from the interface to the line 333 in a case where the data addressed to the group A is input from the terminal 311 to the interface to the line 331,.

FIG. 7 is an explanatory diagram for showing an example of the path control information held by the data transfer apparatus 322 according to the embodiment of this invention.

Path control information 711 shown in FIG. 7 is an example of information held by the data transfer apparatus 322 as the path control information 252 or 271.

The path control information 711 includes four columns of a destination address 731, a source address 732, an output interface 733, and an input interface 734. Descriptions of those columns are similar to those of the destination address 631, the source address 632, the output interface 633, and the input interface 634 shown in FIG. 6, respectively. Therefore, descriptions thereof will be omitted.

It should be noted that in the example of FIG. 7, the "interface to the line 332 " is registered as the output interface 733 corresponding to the value "terminal 311" of the destination address 731 (entry 721). No information is registered as the source address 732 and the input interface 734 corresponding to the "terminal 311 ". The entry 721 indicates that the input interface is valid in a case where data from the terminal 311 is input to the interface to the line 332.

FIG. 8 is an explanatory diagram for showing an example of the path control information held by the data transfer apparatus 323 according to the embodiment of this invention.

Path control information 811 shown in FIG. 8 is an example of information held by the data transfer apparatus 323 as the path control information 252 or 271.

The path control information 811 includes four columns of a destination address 831, a source address 832, an output interface 833, and an input interface 834. Descriptions of those columns are similar to those of the destination address 631, the source address 632, the output interface 633, and the input interface 634 shown in FIG. 6, respectively. Therefore, descriptions thereof will be omitted.

In the example of FIG. 8, the "interface to the line 331" is registered as the output interface 833 corresponding to the value "terminal 311" of the destination address 831 (entry 821) as in the entry 621 of FIG. 6. However, in the example of FIG. 8, no entry in which the destination address 831 indicates the "group A" as in the entry 622 of FIG. 6 is registered.

FIG. 9 is an explanatory diagram for showing an example of the path control information held by the active data transfer apparatus 421 constituting the virtual data transfer apparatus 324 according to the embodiment of this invention.

Path control information 911 shown in FIG. 9 is an example of information held by the active data transfer apparatus 421 as the path control information 252 or 271.

The path control information 911 includes four columns of a destination address 931, a source address 932, an output interface 933, and an input interface 934. Descriptions of those columns are similar to those of the destination address 631, the source address 632, the output interface 633, and the input interface 634 shown in FIG. 6, respectively. Therefore, descriptions thereof will be omitted.

It should be noted that in the example of FIG. 9, the "interface to the line 431" is registered as the output interface 933 corresponding to the value "terminal 311" of the destination address 931 (entry 921). No information is registered as the source address 932 and the input interface 934 corresponding to the "terminal 311". The entry 921 indicates that the input interface is valid in a case where data from the terminal 311 is input to the interface to the line 431.

Further, in the example of FIG. 9, the "terminal 311", the "interface to the line 434", and the "interface to the line 431" are respectively registered as the source address 932, the output interface 933, and the input interface 934 corresponding to the value "group A" of the destination address 931 (entry 922). The entry 922 indicates that the active data transfer apparatus 421 outputs input data from the interface to the line 434 in a case where the data addressed to the group A is input from the terminal 311 to the interface to the line 431.

FIG. 10 is an explanatory diagram for showing an example of the path control information held by the standby data transfer apparatus 422 constituting the virtual data transfer apparatus 324 according to the embodiment of this invention.

Path control information 1011 shown in FIG. 10 is an example of information held by the standby data transfer apparatus 422 as the path control information 252 or 271.

The path control information 1011 includes four columns of a destination address 1031, a source address 1032, an output interface 1033, and an input interface 1034. Descriptions of those columns are similar to those of the destination address 631, the source address 632, the output interface 633, and the input interface 634 shown in FIG. 6, respectively. Therefore, descriptions thereof will be omitted.

It should be noted that in this embodiment, the standby data transfer apparatus 422 does not hold the path control information 1011. Thus, in the example of FIG. 10, no information is registered in the columns.

In the case where each of the data transfer apparatuses 321 to 324 of this embodiment is a switch that operates in the layer 2, a media access control (MAC) address is registered as the destination address 631 and the like and the source address 632 and the like of FIGS. 6 to 10. In this case, the "group A" of FIG. 6 is a multicast MAC address. Further, numbers for identifying ports (not shown) connected to each line are registered as the output interface 633 and the like and the input interface 634 and the like. On the other hand, in the case where each of the data transfer apparatuses 321 to 324 is a router or a switch that operates in the layer 3, an internet protocol (IP) address is registered as the destination address 631 and the like and the source address 632 and the like of FIGS. 6 to 10. Further, an identifier of the interface connected to each line is registered as the output interface 633 and the like and the input interface 634 and the like.

Figure 11:
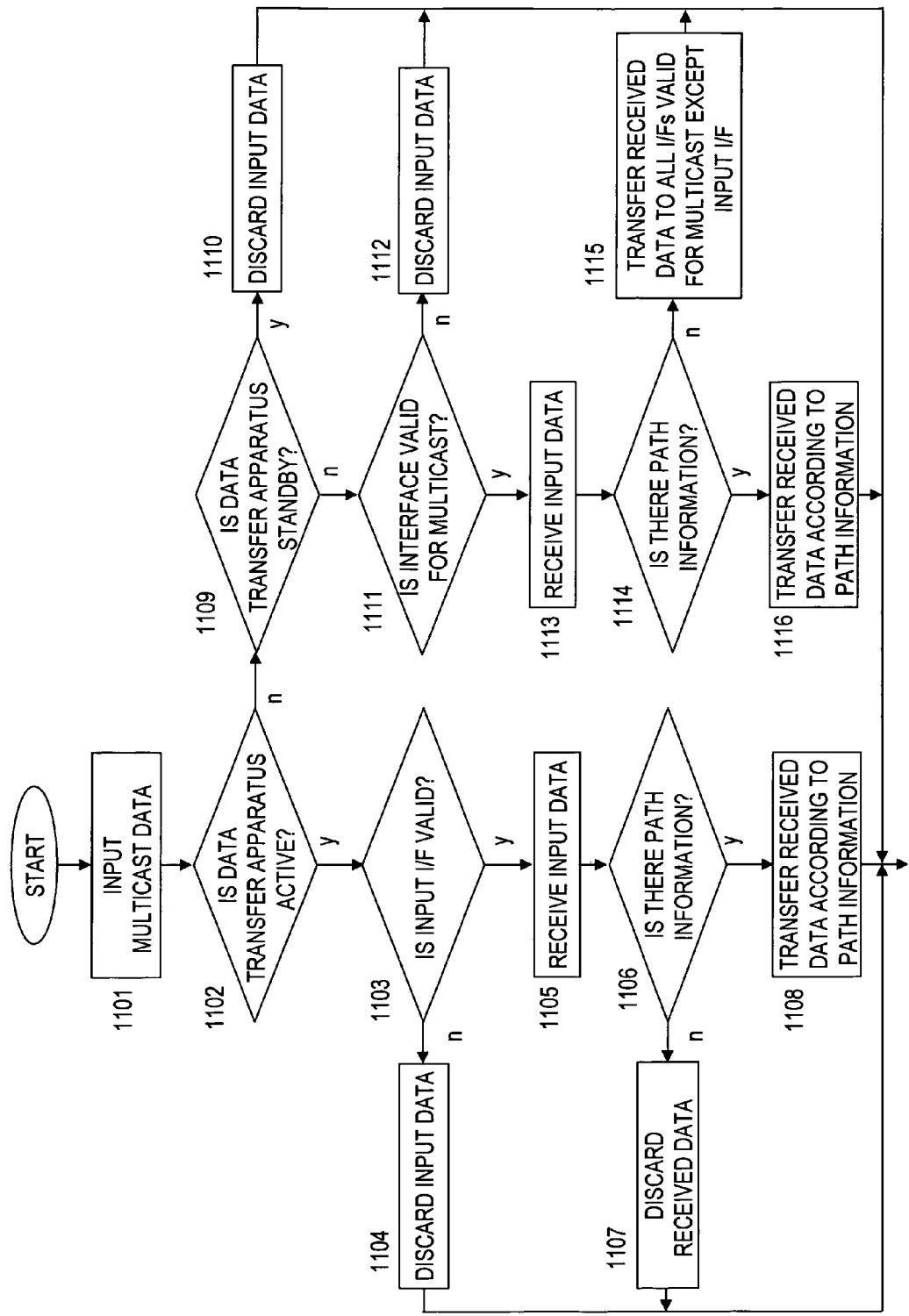
FIG. 11 is a flowchart for showing processing executed by the data transfer apparatus according to the embodiment of this invention.

FIG. 11 is a flowchart for showing processing executed by the data transfer apparatus according to the embodiment of this invention.

The processing shown in FIG. 11 is realized by the transfer processing processor 261 of the data transfer apparatuses 321 to 323, the active data transfer apparatus 421, and the standby data transfer apparatus 422.

First, multicast data is input to the data transfer apparatus (1101).

Next, the data transfer apparatus judges whether a status of the own data transfer apparatus is the active status 111 (1102).

When it is judged in Step 1102 that the status of the own data transfer apparatus is the active status 111, it means that the path control information 252 or 271 is already created in the data transfer apparatus. In this case, the data transfer apparatus judges whether the input interface is valid (1103).

When it is judged in Step 1103 that the input interface is invalid, the data transfer apparatus discards the input data (1104) and ends the processing.

On the other hand, when it is judged in Step 1103 that the input interface is valid, the data transfer apparatus receives the input data (1105).

Next, the data transfer apparatus judges whether path information corresponding to the received data is contained in the path control information 252 or 271 (1106). Here, the phrase "path information corresponding to the received data" refers to information whose combination of the destination address, the source address, and the input interface matches that of the received data, among the pieces of information held as the path control information 252 or 271, examples of which are shown in FIGS. 6 to 10. For example, when the interface to the line 331 receives multicast data to the group A from the terminal 311 in the data transfer apparatus 321, the entry 622 of FIG. 6 corresponds to the path information corresponding to the received data.

When it is judged in Step 1106 that the path control information contains no path information corresponding to the received data, the data transfer apparatus cannot transfer the received data. Accordingly, the data transfer apparatus discards the received data (1107) and ends the processing.

On the other hand, when it is judged in Step 1106 that the path control information contains path information corresponding to the received data, the data transfer apparatus transfers the received data according to the path information (1108) and ends the processing. Here, the phrase "transfers the received data according to the path information" means that the received data is transmitted from the interface indicated as the output interface 633 and the like of the path information corresponding to the received data.

When it is judged in Step 1102 that the status of the own data transfer apparatus is not the active status 111, the data transfer apparatus judges whether the status of the own data transfer apparatus is the standby status 112 (1109).

When it is judged in Step 1109 that the status of the own data transfer apparatus is the standby status 112, the data transfer apparatus does not transfer the data. Thus, the data transfer apparatus discards the input data (1110) and ends the processing.

On the other hand, when it is judged in Step 1109 that the status of the own data transfer apparatus is not the standby status 112, it means that the status of the own data transfer apparatus is the transient status 113. In other words, it is not yet judged that the path control information 252 or 271 has been created in the own data transfer apparatus. In this case, the data transfer apparatus judges whether the interface to which data has been input is an interface valid for multicast data transfer (1111).

When it is judged in Step 1111 that the interface is invalid for multicast data transfer, the data transfer apparatus does not transfer the multicast data. Thus, the data transfer apparatus discards the input data (1112) and ends the processing.

On the other hand, when it is judged in Step 1111 that the interface is valid for multicast data transfer, the data transfer apparatus receives the input data (1113).

Next, the data transfer apparatus judges whether path information corresponding to the received data is contained in the path control information 252 or 271 (1114).

When it is judged in Step 1114 that the path control information contains no path information corresponding to the received data, the path information corresponding to the received data may not be created yet. In this case, the data transfer apparatus transfers the received data to all interfaces valid for multicast data transfer except the interface to which the received data has been input (1115), and ends the processing.

On the other hand, when it is judged in Step 1114 that the path control information contains the path information corresponding to the received data, it means that the path information corresponding to the received data has already been created. In this case, the data transfer apparatus transfers the received data according to the path information (1116) and ends the processing.

As described above, when it is not judged that the path information corresponding to the received data has been created, the received data is transmitted to each line from all the interfaces valid for multicast data transfer.

Hereinafter, description will be given of specific examples of data transfer with reference to FIGS. 1 to 11.

An example will be given of a case where multicast data is transmitted from the terminal 311 to the line 331 with the group A as the destination. Data is input to the data transfer apparatus 321 from the interface to the line 331 (Step 1101 of FIG. 11). The data transfer apparatus 321 confirms that the input interface is valid by referring to the entry 621 of FIG. 6 (1103). Then, the data transfer apparatus 321 transmits the data to the interface to the line 333 according to the entry 622 (1108).

Data is input to the data transfer apparatus 323 from the interface to the line 331 (1101). The data transfer apparatus 323 confirms that the input interface is valid by referring to the entry 821 of FIG. 8 (1103). However, because the data transfer apparatus 323 is a non-multicast data transfer apparatus, the input data is not transmitted from any interface.

Data is input to the virtual data transfer apparatus 324 from the interface to the line 333.

Data is input to the active data transfer apparatus 421 constituting the virtual data transfer apparatus 324 from the interface to the line 431 corresponding to the line 333 (1101). The active data transfer apparatus 421 confirms that the input interface is valid by referring to the entry 921 of FIG. 9 (1103). Then, the active data transfer apparatus 421 transmits the data from the interface to the line 434 according to the entry 922 (1108). Because the line 434 corresponds to the line 336, the data is transmitted to the line 336 from the virtual data transfer apparatus 324.

Data is input to the standby data transfer apparatus 422 constituting the virtual data transfer apparatus 324 from the interface to the line 431 corresponding to the line 333 (1101). However, because the standby data transfer apparatus 422 does not perform the data transfer processing, the input data is discarded (1102, 1109, and 1110).

Data is input to the data transfer apparatus 322 from the interface to the line 336 (1101). However, the data transfer apparatus 322 confirms that the input interface is invalid by referring to the entry 721 of FIG. 7 (1103). Thus, the data transfer apparatus 322 discards the input data (1104).

Subsequently, a description will be given of a case where a failure has occurred in the active data transfer apparatus 421 constituting the virtual data transfer apparatus 324.

The data transfer apparatus 422 whose current status is the standby status 112 can judge whether the data transfer apparatus 421 whose current status is the active status 111 is being operated normally. Methods for the judgment may be of any method. For example, the data transfer apparatus 421 may periodically transmit a predetermined signal to the data transfer apparatus 422. When the data transfer apparatus 421 starts to operate abnormally due to an occurrence of a failure or the like, it becomes impossible for the data transfer apparatus 421 to periodically transmit the predetermined signal to the data transfer apparatus 422. When the periodic transmission of the predetermined signal stops, the data transfer apparatus 422 can judge that the data transfer apparatus 421 has started to operate abnormally.

When a failure occurs in the data transfer apparatus 421, the status of the data transfer apparatus 421 transits from the active status 111 to the standby status 112 as shown in the status transition 121 of FIG. 1. The status of the data transfer apparatus 422 transits from the standby status 112 to the transient status 113 as shown in the status transition 122 of FIG. 1. A description will be given of a case where multicast data is transmitted from the terminal 311 to the line 331 with the group A as the destination in this status.

Data is input to the data transfer apparatus 421 whose status has newly become the standby status 112, from the interface to the line 431 corresponding to the line 333 (1101). However, because the standby data transfer apparatus 421 does not perform the data transfer processing, the input data is discarded (1102, 1109, and 1110).

In the data transfer apparatus 422 immediately after transition to the transient status 113, the path control information is as shown in FIG. 10. In this case, the path control information contains no path information. Thus, when data is input from the interface to the line 431 corresponding to the line 333, the data transfer apparatus 422 cannot confirm whether the input interface is valid. However, because the data transfer apparatus 422 is in a transient status 113 (1109), the data transfer apparatus 422 receives the data irrespective of the validity of the input interface as long as the interface to which the data has been input is an interface valid for multicast data transfer (1111, 1113).

The path information corresponding to the received multicast data is not contained in the path control information of FIG. 10 (1114). However, because the data transfer apparatus 422 is in the transient status, the data transfer apparatus 422 transmits, the received data, from all the interfaces valid for multicast data transfer except the input interface, according to the entry 525 of FIG. 5 (1115). Specifically, the data transfer apparatus 422 transmits the data from the interface to the line 433 and the interface to the line 434 excluding the interface to the line 431 which is the input interface. The lines 433 and 434 respectively correspond to the lines 335 and 336. Accordingly, the data is eventually transmitted from the interface to the line 335 and the interface to the line 336. The multicast data transmitted from those interfaces is input to the data transfer apparatus 322 (1101). However, the data transfer apparatus 322 confirms that the input interface is invalid by referring to the entry 721 of FIG. 7 (1103). Thus, the data transfer apparatus 322 discards the input data (1104).

When it is judged that creation of path control information has been completed, the status of the data transfer apparatus 422 in the transient status 113 of FIG. 1 transits to the active status 111 as shown in the status transition 123. The completion of the creation of the path control information may be judged by, for example, a period by which information is exchanged by a path control protocol for updating the path control information. Specifically, the completion of the creation of the path control information may be judged upon elapse of a time determined based on the period after the data transfer apparatus 422 transits to the transient status 113 and the creation of the path control information is started.

The above path control protocol may be at least one of the following, for example, Routing Information Protocol (RIP), Open Shortest Path First (OSPF), Border Gateway Protocol (BGP), Intermediate system to intermediate system (IS-IS), Protocol Independent Multicast-Sparse Mode (PIM-SM), Protocol Independent Multicast-Dense Mode (PIM-DM), Distance Vector Multicast Routing Protocol (DVMRP), Multiprotocol Extensions for BGP (MBGP), Internet Group Membership Protocol (IGMP), or Multicast Listener Discovery (MLD).

Alternatively, the completion of the creation of the path control information may be judged upon elapse of a predetermined time after the data transfer apparatus 422 transits to the transient status 113 and the creation of the path control information is started. In this case, the predetermined time may be set by a user.

This invention is applicable to industries regarding a telecommunication control technique used in the Internet, for example.

While the present invention has been described in detail and pictorially in the accompanying drawings, the present invention is not limited to such detail but covers various obvious modifications and equivalent arrangements, which fall within the purview of the appended claims.

What is claimed is:

1. A data transfer apparatus coupled to a network, comprising a plurality of interfaces for transmitting and receiving data, wherein the data transfer apparatus is configured to:
   create transfer destination information for correlating a destination of the data with the interfaces for transmitting the data to be transmitted to the destination;
   hold the created transfer destination information;
   transmit, upon reception of multicast data via one of the interfaces before being judged that the transfer destination information has been created, the multicast data from at least one of the interfaces irrespective of the transfer destination information; and
   transmit, upon reception of the multicast data via the one of the interfaces after being judged that the transfer destination information has been created, the received data from the interfaces correlated with the destination of the received data by the transfer destination information, wherein
   a status of the data transfer apparatus is one of a standby status in which data is not transferred, an active status in which data is transferred, and a transient status which is a status during a transition from the standby status to the active status,
   the data transfer apparatus is further configured to start the creation of the transfer destination information after the status of the data transfer apparatus has changed from the standby status to the transient status, and
   the status of the data transfer apparatus changes from the transient status to the active status after being judged that the transfer destination information has been created.

2. The data transfer apparatus according to claim 1, wherein:
   the network is further coupled with another data transfer apparatus;
   the another data transfer apparatus has interfaces coupled to each line in the network, to which each of the interfaces of the data transfer apparatus is coupled;
   the status of the data transfer apparatus is the standby status when a status of the another data transfer apparatus is the active status; and
   the status of the data transfer apparatus changes from the standby status to the transient status when being judged that the another data transfer apparatus is not being operated normally.

3. The data transfer apparatus according to claim 2, wherein:
   the another data transfer apparatus periodically transmits a predetermined signal to the data transfer apparatus; and the data transfer apparatus is further configured to judge that the another data transfer apparatus is not being operated normally when a periodic reception of the predetermined signal from the another data transfer apparatus stops.

4. The data transfer apparatus according to claim 1, wherein the data transfer apparatus is further configured to transmit, upon reception of the multicast data before being judged that the transfer destination information has been created, the received data from the interfaces valid for multicast data transfer except the interface that has received the data.

5. The data transfer apparatus according to claim 1, wherein the data transfer apparatus is further configured to receive, upon input of the multicast data to the one of the interfaces before being judged that the transfer destination information has been created, the input data without discarding the data, irrespective of whether the input of the data to the interface is valid.

6. The data transfer apparatus according to claim 5, wherein the data transfer apparatus is further configured to:
    judge, upon the input of the multicast data to the one of the interfaces after being judged that the transfer destination information has been created, whether a transmission source of the input data is registered in the transfer destination information as the destination of the data, and whether the registered destination of the data is correlated with the interface to which the data has been input by the transfer destination information;
    judge that the input of the data to the interface is valid when the transmission source of the input data is registered in the transfer destination information as the destination of the data, and the registered destination of the data is correlated with the interface to which the data has been input by the transfer destination information;
    judge that the input of the data to the interface is invalid when one of the registration of the transmission source of the input data in the transfer destination information as the destination of the data and the correlation of the registered destination of the data with the interface to which the data has been input by the transfer destination information is not achieved; and
    discard the input data when being judged that the input of the data to the interface is invalid.

7. The data transfer apparatus according to claim 1, wherein the data transfer apparatus is further configured to judge that the transfer destination information has been created upon elapse of a time determined by a path control protocol, which is used in the creation of the transfer destination information, after a start of the creation of the transfer destination information.

8. The data transfer apparatus according to claim 7, wherein the path control protocol includes at least one of an RIP, an OSPF, a BGP, an IS-IS, a PIM-SM, a PIM-DM, a DVMRP, an MBGP, an IGMP, and an MLD.

9. The data transfer apparatus according to claim 1, wherein the data transfer apparatus is further configured to judge that the transfer destination information has been created upon elapse of a predetermined time after a start of the creation of the transfer destination information.

10. The data transfer apparatus according to claim 1, wherein the transfer destination information includes information for correlating a multicast MAC address to be the destination of the data with a port number of the interfaces for transmitting the data to be transmitted to the destination.

11. The data transfer apparatus according to claim 1, wherein the transfer destination information includes information for correlating an IP address to be the destination of the data with an identifier of the interfaces for transmitting the data to be transmitted to the destination.

* * * * *